(12) United States Patent
Chakinam et al.

(10) Patent No.: US 10,459,694 B2
(45) Date of Patent: Oct. 29, 2019

(54) INTELLIGENT CHECKING ENGINE

(71) Applicant: Bank of America Corporation, Charlotte, NC (US)

(72) Inventors: Srinath Chakinam, Hyderabad (IN); Bharathi Tadepalli, Hyderabad (IN); Kalyan Chakravarthy Pallapolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/784,447

(22) Filed: Oct. 16, 2017

(65) Prior Publication Data

US 2019/0114148 A1  Apr. 18, 2019

(51) Int. Cl.

| | |
|---|---|
| *G06F 9/44* | (2018.01) |
| *G06F 8/20* | (2018.01) |
| *G06N 20/00* | (2019.01) |
| *G06F 11/00* | (2006.01) |
| *G06Q 10/00* | (2012.01) |
| *G06N 20/10* | (2019.01) |
| *G06Q 10/06* | (2012.01) |

(52) U.S. Cl.
CPC .......... *G06F 8/20* (2013.01); *G06F 11/00* (2013.01); *G06N 20/00* (2019.01); *G06N 20/10* (2019.01); *G06Q 10/00* (2013.01); *G06Q 10/06395* (2013.01)

(58) Field of Classification Search
CPC ....................................................... G06F 8/20
USPC ........................................................ 717/126
See application file for complete search history.

(56) References Cited

U.S. PATENT DOCUMENTS

| | | |
|---|---|---|
| 6,738,760 B1 | 5/2004 | Krachman |
| 6,901,346 B2 | 5/2005 | Tracy et al. |
| 6,993,448 B2 | 1/2006 | Tracy et al. |
| 7,330,817 B1 | 2/2008 | Exall et al. |
| 7,539,977 B1 * | 5/2009 | Bloom ............... G06F 11/3604 717/124 |
| 7,702,613 B1 * | 4/2010 | Dankenbring ...... G06F 11/3684 707/687 |
| 7,797,257 B2 | 9/2010 | Barnhill et al. |

(Continued)

*Primary Examiner* — Wei Y Zhen
*Assistant Examiner* — Lanny N Ung
(74) *Attorney, Agent, or Firm* — Weiss & Arons LLP; Michael A. Springs, Esq.

(57) ABSTRACT

Apparatus and methods for an intelligent audit engine are provided. Product development artifacts may be associated with artifact tags and stored in an artifact repository. The audit engine may retrieve an artifact for audit. The audit engine may identify a set of development guidelines in a rule repository based on their artifact tags. The audit engine may determine whether the development guidelines have been satisfied based on stored product testing data. A failed development guideline may initiate a workflow that includes notification of a project stakeholder regarding the failure. The notification may include remediation measures to be taken by the stakeholder. The validation process may iterate until all guidelines have passed validation. A machine-learning algorithm may prioritize a development guideline for future audits to increase efficiency. The machine learning algorithm may educate stakeholders to reduce audit failures.

7 Claims, 3 Drawing Sheets

(56) References Cited

U.S. PATENT DOCUMENTS

| | | | |
|---|---|---|---|
| 8,413,105 B2* | 4/2013 | Adi | G06Q 10/06 |
| | | | 717/101 |
| 9,274,874 B1* | 3/2016 | Chamness | G06F 11/0709 |
| 2004/0128653 A1* | 7/2004 | Arcand | G06F 11/3688 |
| | | | 717/124 |
| 2005/0257267 A1* | 11/2005 | Williams | H04L 63/0227 |
| | | | 726/25 |
| 2007/0094189 A1* | 4/2007 | Yamamoto | G06F 11/3684 |
| | | | 706/45 |
| 2009/0265694 A1* | 10/2009 | Bakowski | G06F 11/3676 |
| | | | 717/131 |
| 2012/0198421 A1* | 8/2012 | Arumugham | G06F 11/368 |
| | | | 717/125 |
| 2015/0095890 A1* | 4/2015 | Stclair | G06F 8/10 |
| | | | 717/124 |

* cited by examiner

FIG. 3

INTELLIGENT CHECKING ENGINE

FIELD OF TECHNOLOGY

This disclosure relates to an intelligent audit engine. In particular, the disclosure relates to an intelligent audit engine configured to detect and remediate audit failures and use machine learning to improve audit results.

BACKGROUND

The software development life cycle (SDLC) proceeds through multiple stages of development and testing. Illustrative stages include a development stage, a component testing stage, a system testing stage, a functional testing stage and a production stage. At each stage, specific requirements must be satisfied in order to deem the stage to be complete. These requirements may be reviewed in a series of internal and external audits.

Due to the number of audits that must be completed over the course of the SDLC, the audit process is often plagued with oversight and error. Moreover, each stage may involve different stakeholders, with different allocations of responsibility. The involvement of multiple stakeholders complicates assignment of responsibility for audit failures and makes it difficult to identify and implement comprehensive remediation measures.

The involvement of multiple stakeholders also makes it difficult to evaluate patterns behind failures and assess the effectiveness of remediation strategies. These difficulties in turn impede the development of proactive protocols designed to address specific weaknesses in the SDLC.

It would be desirable, therefore, to implement a comprehensive review encompassing audit requirements for all stages of the software development lifecycle. It would further be desirable to integrate detection of audit failures with remediation measures. It would further be desirable to combine the comprehensive review with machine learning to identify and implement changes that will improve efficiency and reduce audit failures.

SUMMARY OF THE DISCLOSURE

Apparatus and methods for an intelligent audit engine are provided.

The audit engine may include a processor configured to retrieve a product development artifact from an artifact repository. The artifact may be associated with an artifact tag.

The audit engine may include machine readable memory. The audit engine may identify a set of development guidelines associated with the artifact tag. The audit engine may load the development guidelines into machine readable memory.

The audit engine processor may be further configured to validate each of the development guidelines. Validating a development guideline may include determining whether the guideline has been satisfied. The determination may be based on stored product testing data.

If a development guideline fails validation, the audit engine processor may initiate a workflow associated with the failed development guideline. The workflow may include notifying a product development stakeholder of the failed guideline. The audit engine may register an action taken by the stakeholder in response to the notification. The validation may iterate until the development guideline passes validation.

If a development guideline passes validation, the audit engine processor may log artifact report data.

The audit engine may include a machine learning algorithm. Based on artifact report data, the machine learning algorithm may determine that a development guideline has been associated with a threshold number of validation failures. The machine learning algorithm may instruct the processor to prioritize validation of the development guideline with regard to future audits.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Apparatus and methods for an intelligent audit engine incorporating a semi-supervised machine learning algorithm are provided. The audit engine may be referred to as an Intelligent Checking Engine ("ICE"). The audit engine may integrate audit procedures with remediation for an audit failure. The audit engine may be configured to adjust audit parameters based on past audit results and past remediation measures.

An audit may review satisfaction of product development requirements. The product may be a software product. Development of a software product may proceed through multiple stages of a software development life cycle (SDLC). Illustrative stages include a development stage, component testing stage, a system testing stage, a functional testing stage and a production stage. Each stage may include a set of development guidelines.

The development guidelines for each stage may be embodied in planning documents and other associated protocols. An audit of a planning document may be based on a review of the development guidelines laid out in document. The full SDLC may encompass a multitude of planning documents incorporating hundreds or thousands of corresponding development guidelines. For each planning document, the audit engine may identify corresponding guidelines and implement targeted remediation measures in the event of an audit failure.

The audit engine may include a setup phase. The setup phase may include creation of an artifact repository, creation of a rule repository and setup of reference system access.

The audit engine may be associated with an artifact repository. In some embodiments, the audit engine may be in communication with a remote artifact repository. In some embodiments, the audit engine may incorporate an artifact repository component.

The term "artifact" encompasses many kinds of tangible by-products produced during the development of software. Artifacts may be documents needed to execute tasks during various stages of the SDLC. Some artifacts may describe the function, architecture, and design of software. Other artifacts may be concerned with the process of development itself. Illustrative examples include project plans, business cases, and risk assessments.

An artifact may be a planning document. The planning document may include guidelines that must be satisfied. The planning document may be a functional test plan. The planning document may be a production test plan. A set of planning documents may be specific to a single stage of the SDLC. For example, artifacts for the development stage may include a high level planning document that corresponds to one set of guidelines and a low level planning document that corresponds to a different set of guidelines. Planning documents for all stages of development may be artifacts handled by the audit engine.

An artifact may be submitted to the artifact repository by a stakeholder in the SDLC, an audit engine administrator or any other suitable party. Some types of SDLC documents may automatically be copied to the artifact repository.

Each artifact in the artifact repository may be associated with a keyword. The keyword may be included in a heading. The keyword may identify a type of document. For example, a keyword may identify a document as a test plan. The type of document may be specific to a single stage of the SDLC. The keyword may indicate a SDLC stage associated with the artifact. For example, an artifact from the development stage may be associated with the keyword "DEV." An artifact may be associated with the keyword by the creator of the artifact, an SDLC stakeholder, the audit engine or any other suitable party or device. The keyword may be an artifact tag.

The audit engine may be associated with a rule repository. In some embodiments, the audit engine may be in communication with a remote rule repository. In some embodiments, the audit engine may incorporate a rule repository component.

The rule repository may store development guidelines corresponding to SDLC artifacts.

The development guidelines may be manually entered into the system. The development guidelines may be submitted individually. The development guidelines may be submitted as a set. The set of development guidelines may be associated with a single stage of the SDLC. The set of development guidelines may be derived from an SDLC artifact or from any suitable document. The artifact may be associated with a single stage of the SDLC. The artifact may be an artifact in the artifact repository.

Each development guideline may be associated with a keyword. The keyword may link a development guideline to a type of document. For example, a keyword may be associated with a test plan. The set of development guidelines may correspond to the content of the test plan. The keyword may link the development guideline to a single stage of the SDLC. The keyword may link the development guideline to more than one stage of the SDLC. The keyword may be an artifact tag.

New development guidelines may be added to the repository. The new development guidelines may correspond to changes to a document type. The new development guidelines may be added to the repository in response to the creation of new documents.

The development guidelines may be configured as logical rules. The rule repository may be a configuration system.

The intelligent audit engine may be trained to identify artifacts and development guidelines using a semi-supervised machine learning algorithm. The training may be based on existing data. The existing data may include an existing artifact that corresponds to a known set of development guidelines. For example, the training may be based on the development guidelines derived from a test plan.

The audit engine may learn to classify newly added guidelines. The audit engine may learn to audit new artifacts by identifying corresponding development guidelines. The audit engine may assign a keyword to a new artifact or a new guideline. The keyword may be an artifact tag. The machine learning algorithm may incorporate a module for manual intervention. The manual intervention may correct identification of an artifact or classification of a guideline. The manual intervention may correct an artifact tag. Information entered through manual intervention may be incorporated into the training. Semi-supervised machine learning renders the classification model adaptive, robust and scalable.

The audit engine may be configured to access one or more reference systems that store data generated during development and testing processes. Illustrative reference systems include issue tracking and test management software such as JIRA developed by Atlassian, Inc. of Sydney, Australia; HP Quality Center developed by Hewlett Packard Enterprise of Sunnyville, Calif., USA; Team Foundation Server, developed by Microsoft Corporation of Redmond, Wash. USA; and Tricentis TOSCA, developed by Tricentis of Vienna, Austria. The reference systems may store information relating to test dates, test results, test parameters, stakeholder approvals or any other suitable information.

The audit engine may include a code repository that enables a processor to connect to an outside system. Configuration of the audit engine may encode configurable item information and dependent system information. The configurable item information may include configurable XMLs that include user name and password. The configurable item information may include domain and project information. The XMLs may be in encrypted form.

Following setup of the artifact repository, the rule repository and the reference system access, the audit engine may include an execution phase. The audit engine may audit an artifact from the artifact repository using development guidelines from the rule repository and testing data from a reference system. The execution phase may invoke an orchestration module, a decision module, a workflow notification module, a reporting module and a self-learning module.

The audit engine may retrieve an artifact from the artifact repository. Retrieval of an artifact from the artifact repository may trigger an orchestration module. In some embodiments, the orchestration module may retrieve the artifact from the artifact repository. The orchestration module may identify a keyword associated with the artifact. The keyword may be included within an artifact header. The keyword may be an artifact tag.

The orchestration module may access the audit rule repository. The audit engine may identify development guidelines associated with the artifact keyword. The keyword may be an artifact tag. The audit engine may load development guidelines associated with the artifact keyword into audit engine memory.

A decision module may validate the development guidelines. Validation may determine whether each of the loaded development guidelines has been satisfied. The decision module may access various reference systems for product testing data. Examples of product testing data may include information relating to product test dates, product test results, product test parameters, project stakeholder approvals or any other suitable information. The audit engine may determine if the development guideline has been satisfied based on the product testing data.

For example, the development guidelines may include a requirement that a test be passed within a specific time frame. The audit engine may access a reference system and locate test cases. The audit engine may capture dates for test passes. The audit engine may determine that the tests were passed within the scheduled timeline.

Validation may proceed using a binary pass-fail model. Each development guideline or logical rule may be determined to be in a pass or fail state. A development guideline that has been satisfied may pass validation. A development guideline that has not been satisfied may fail validation.

The audit engine may determine that all of the development guidelines have passed validation. When a development guideline has passed validation, the audit engine may log report data indicating that the development guideline has passed validation. When all of the development guidelines have passed validation, the audit engine may log report data indicating that the artifact has passed the audit.

The audit engine may determine that one or more of the development guidelines has not been satisfied. Failed validation of a development guideline may trigger remediation measures. The audit engine may identify applicable remediation procedures associated with the failed development guideline.

Failed validation of a development guideline may initiate a workflow notification module. The workflow may be dependent on the cause of the failure. The workflow may be dependent on the development guideline that has not been satisfied. The workflow may be dependent on a product development stakeholder associated with the failed validation. The stakeholder may be any party involved with development of the product. The workflow may relate to remediation measures.

The workflow notification module may initiate communication with one or more product development stakeholders associated with the failure. For example, if a development guideline requiring approval by a line of business is not satisfied, a workflow may be initiated for contacting the line of business for approval.

The audit engine may generate an automatic message to the stakeholder. The message may be an electronic message, a voice message or any suitable form of communication. The message may notify the stakeholder of an audit failure. The message may include instructions for implementing one or more targeted remediation procedures. The message may include a hyperlink that conveys the stakeholder to an interface for implementing the remediation procedures.

The audit engine may register an action by the stakeholder in response to the message. The notification may be configured to register entry of a confirmation by the recipient of the notification.

The audit engine may hold the set of development guidelines in memory. The audit engine may validate the development guidelines in an iterative process until all of the development guidelines have been satisfied. In some embodiments, the audit engine may repeat the validation only after registering an action by a stakeholder. The audit engine may repeat validation of the full set of development guidelines. The audit engine may repeat validation of the failed development guideline only.

The audit engine may include a reporting module. The reporting module may store audit report data. The reporting module may store information indicating which artifacts have been audited. The reporting module may store information related to development guidelines that have failed validation. The reporting module may store information related to development guidelines that have passed validation. Audit reports may be published to a project manager. The reporting module may include data analytics. Data analytics may be represented on a dashboard. The dashboard may be accessible by a project manager. The dashboard may be an interactive dashboard. The project manager may customize the dashboard to focus on different aspects of the data. Data analytics may be represented in the form of reports. The reporting module may send notifications regarding the reports to one or more project managers.

The audit engine may include a self-learning module. The self-learning module may be semi-supervised. The self-learning module may modify audit protocols with minimal user intervention. The intelligent learning module may modify audit protocols without user intervention.

The self-learning module may access audit report data. The self-learning module may identify a development guideline that has failed validation more than a threshold number of times. The self-learning module may instruct the determination module to prioritize validation of the development guideline for future audits. The determination module may validate the prioritized development guideline prior to validation of other development guidelines. The determination module may refrain from validating other development guidelines until the prioritized development guideline is validated through iterative processing. Prioritizing the development guideline may conserve resources by preventing iterative processing of the remaining rules.

The self-learning module may be configured to educate stakeholders to prevent future audit failures. The self-learning module may identify a stakeholder associated with one or more past audit failures. The stakeholder may be associated with a threshold number of audit failures. The self-learning module may initiate communication with a project manager associated with the stakeholder. The self-learning module may initiate communication with a line of business associated with the audit failure. The self-learning module may inform the project manager of the pattern of audit failures. The self-learning module may identify remediation measures. The self-learning module may communicate the remediation measures. The self-learning module may initiate communications with a stakeholder or with a project manager without human intervention.

The self-learning module may incorporate any suitable supervised machine learning algorithm. The learning algorithm may be a support vector machine. The support vector machine may be configured for linear or non-linear classification, regression analysis or any suitable algorithm. The support vector machine may use a training algorithm to build models for classification.

The intelligent audit engine may include a non-transitory machine readable memory. The non-transitory memory may store computer executable instructions. The audit engine may include a processor configured to execute the computer executable instructions. For example, a processor circuit may be embedded in an integrated circuit board of the smart factory. The processor may control overall operation of the audit engine and its associated components.

The audit engine may include RAM, ROM, an input/output ("I/O") module and a non-transitory or non-volatile memory. The I/O module may include a microphone, button and/or touch screen which may accept user provided input. The I/O module may include one or more of a speaker for providing audio output and a display for providing textual, audiovisual and/or graphical output.

Computer executable instructions such as software applications may be stored within the non-transitory memory and/or other storage media. The software may provide instructions to the processor that enable the audit engine to perform various functions. For example, the non-transitory memory may store software used by the audit engine, such as an operating system, application programs, web browser and a database. Alternatively, some or all of computer executable instructions of the audit engine may be embodied in hardware or firmware components of the system.

Software application programs, which may be used by the audit engine, may include computer executable instructions for invoking user functionality related to communication, such as email, short message service ("SMS"), and voice input and speech recognition applications. Application programs may utilize one or more algorithms that classify development guidelines, validate development guidelines, perform data analytics or any other suitable tasks.

The audit engine may operate in a networked environment. For example, the audit engine may support network connections to other systems within the complex web and patch servers storing software patches. The audit engine may support establishing network connections to one or more remote computers. Such remote computers may be nodes on a network. The nodes may be personal computers or servers that include many or all of the elements described above relative to the audit engine.

The network connections may include a local area network ("LAN") and a wide area network ("WAN"), and may also include other networks. When used in a LAN networking environment, the audit engine may be connected to the LAN through a network interface or adapter. The communication circuit may include the network interface or adapter.

When used in a WAN networking environment, the audit engine may include a modem or other means for establishing communications over a WAN, such as the Internet. It will be appreciated that the existence of any of various well-known protocols such as TCP/IP, Ethernet, FTP, HTTP and the like is presumed, and the audit engine can be operated in a client-server configuration to permit a user to retrieve web pages from a web-based server. Web browsers can be used to display and manipulate data on web pages.

The audit engine and network nodes may include various other components, such as a battery, a speaker, and antennas (not shown). For example, network nodes may be portable devices such as a laptop, a tablet, chat-bot, a smartphone or any other suitable device for receiving, storing, transmitting and/or displaying relevant information.

The audit engine may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The audit engine may utilize computer-executable instructions, such as program modules, executed by a computer. Generally, program modules include routines, programs, objects, components, data structures, etc. that perform particular tasks or implement particular data types. The audit engine may be operational with distributed computing environments where tasks are performed by remote processing devices that are linked through a communications network. In a distributed computing environment, program modules may be located in both local and remote computer storage media including memory storage devices.

A device that accesses the audit engine that may include one or more features of the audit engine. For example, an accessing device may be a smart phone, desktop computer or other device. The accessing device may be operated by a SDLC stakeholder. For example, a stakeholder may use the accessing device to identify a failed development guideline.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
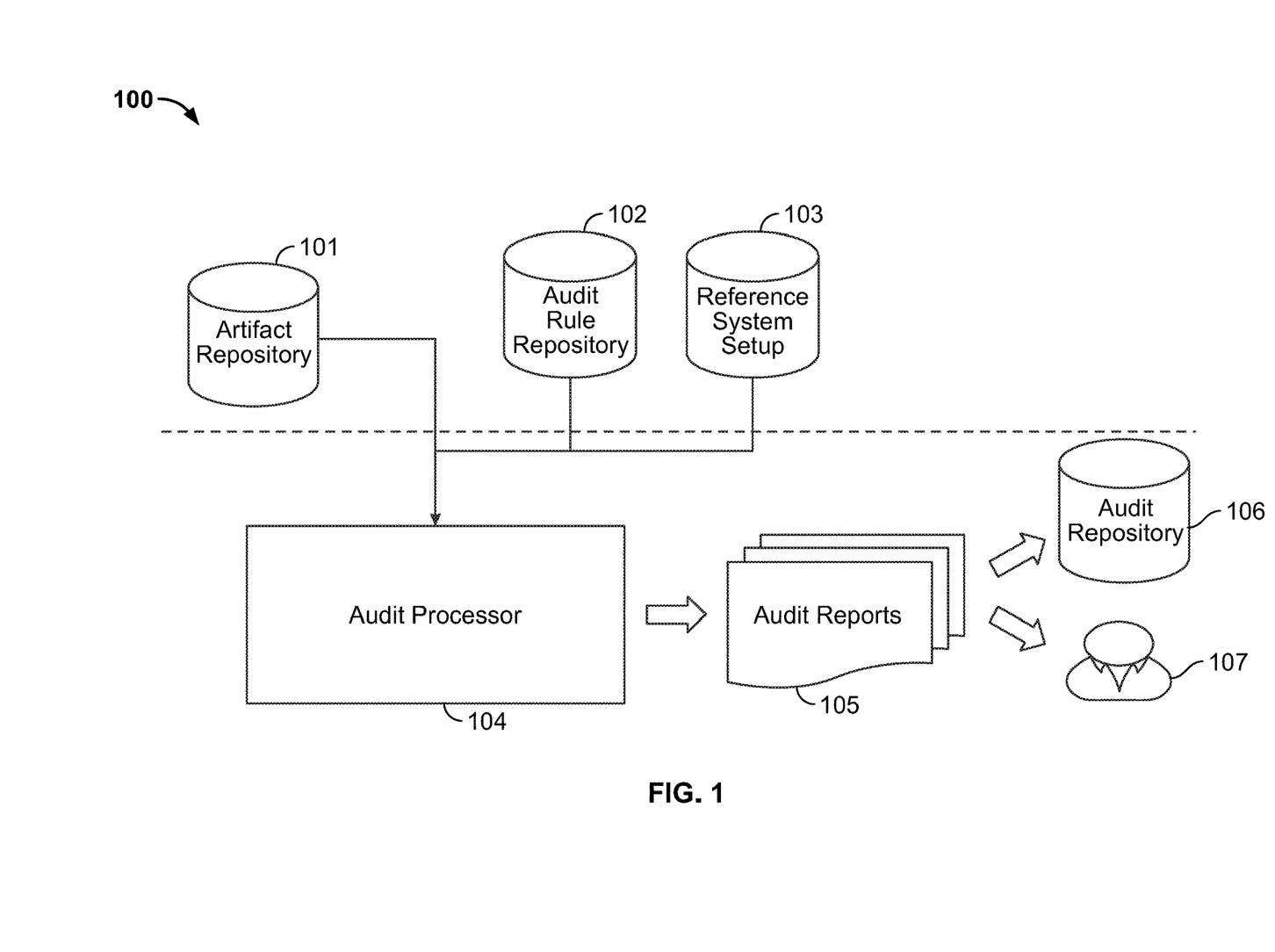
FIG. 1 shows an illustrative hybrid apparatus/flow diagram in accordance with principles of the invention.

FIG. 1 shows illustrative hybrid apparatus/process flow 100. The portion of process 100 above the broken line involves intelligent audit engine setup. As part of the setup process, artifacts may be stored in artifact repository 101. Development guidelines associated with the artifacts may be configured as logical rules and stored in audit rule repository 102. Reference system setup 103 may include a code repository that enables a processor to connect to an outside system and access product testing data.

The portion of process 100 below the broken line involves intelligent audit engine execution. Audit processor 104 may retrieve an artifact from artifact repository 101 and may identify development guidelines associated with the artifact from rule repository 102. The artifact and the development guidelines may be linked by a common keyword. The keyword may be associated with a stage of the SDLC. Audit processor 104 may validate the development guidelines based on product testing data from reference systems 103.

Following validation of a development guideline, pass and fail reports may be logged as audit reports 105. Audit reports 105 may be stored in audit repository 106. Audit reports 105 may be transmitted to stakeholders 107. Stakeholders 107 may be project managers. Reports may be accessed by a project manager via an interactive dashboard.

Figure 2:
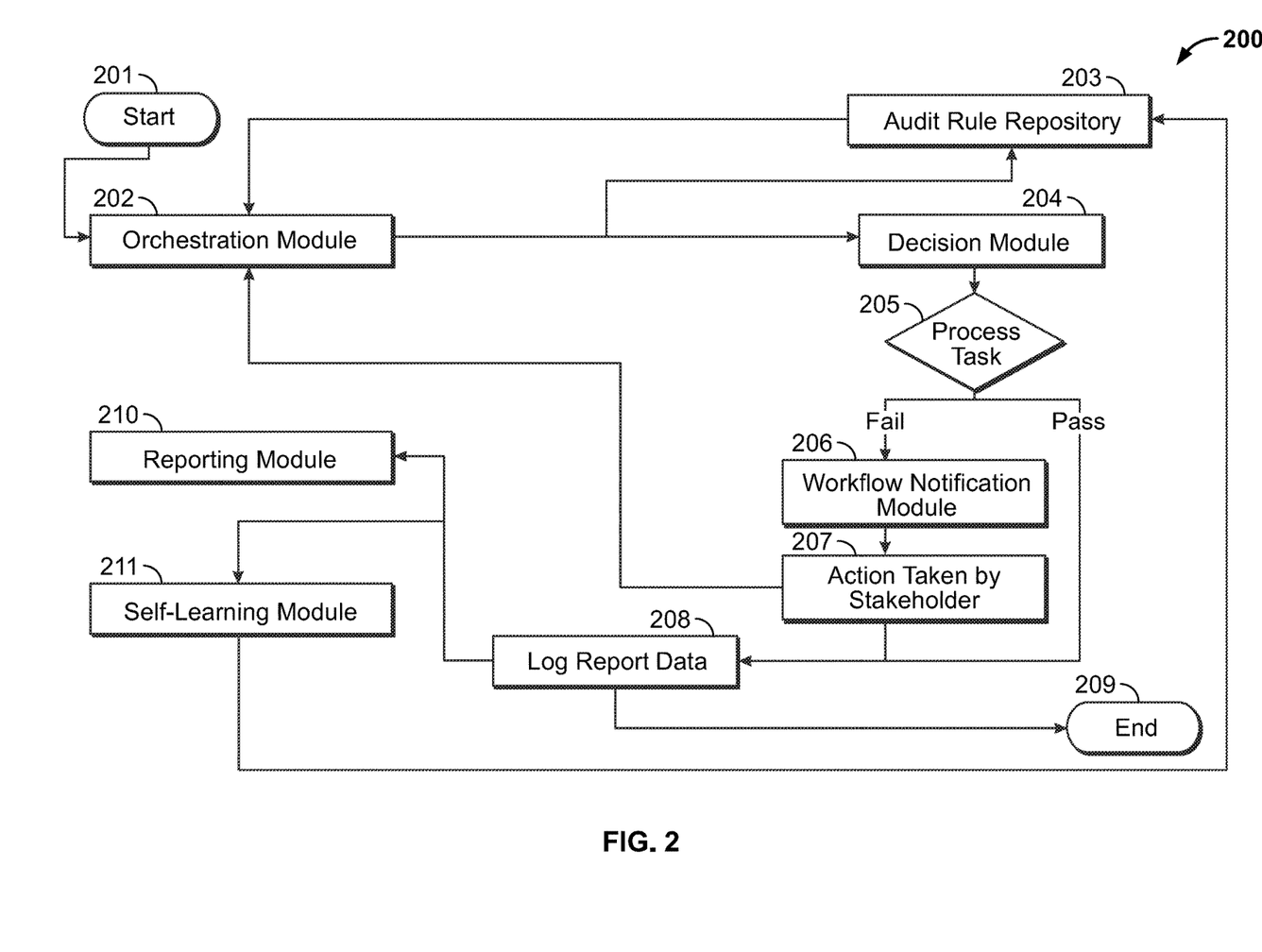
FIG. 2 shows an illustrative hybrid apparatus/flow diagram in accordance with principles of the invention.

FIG. 2 shows illustrative hybrid apparatus/process flow 200. Step 201 shows initiation of an audit.

Orchestration module 202 may retrieve an artifact for auditing. Orchestration module 202 may access the audit rule repository 203 and load development guidelines into memory for validation. The development guidelines may correspond to the artifact. The artifact and the development guidelines may be linked by a common artifact tag. The artifact tag may be associated with a stage of the SDLC.

Decision module 204 may validate each of the development guidelines. Step 205 shows determination of a pass or fail state for each development guideline. A fail state initiates workflow notification module 206. Workflow notification module 206 may notify a stakeholder of the failure and provide remediation instructions. At step 207, the audit engine registers an action taken by a stakeholder in response to the notification. Steps 204-207 may iterate until a pass state is achieved. At step 208, the audit engine logs report data. Step 209 shows the conclusion of the audit process.

Reporting module 210 may compile and present reports to stakeholders. The reports may be presented via an interactive dashboard. Self-learning module 211 may prioritize a development guideline based on the audit reports. Self-learning module 211 may communicate the prioritization to audit rule repository 203.

Figure 3:
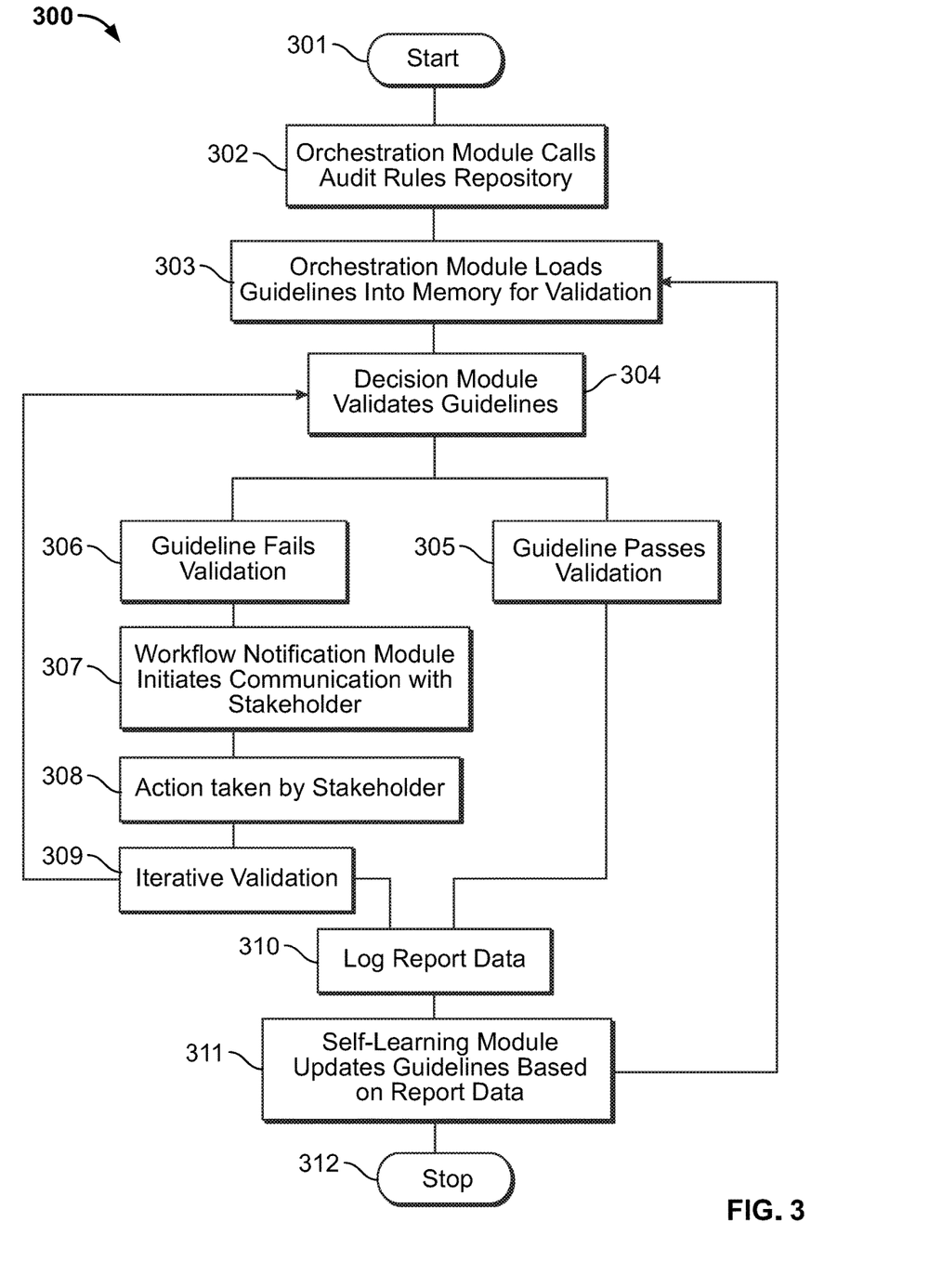
FIG. 3 shows an illustrative process flow in accordance with principles of the invention.

FIG. 3 shows process flow 300. At step 301 an audit is initiated. At step 302 the orchestration module retrieves an artifact for audit. At step 303, the orchestration module loads development guidelines corresponding to the artifact into memory for validation. At step 304, a decision module validates each of the development guidelines. Each development guideline may pass or fail validation.

At step 305, the development guideline passes validation. At step 310 the audit engine logs report data. At step 311, the self-learning module may update development guidelines based on report data. At step 312, the audit concludes.

At step 306 a development guideline fails validation. At step 307, a workflow notification module initiates communication with a stakeholder. At step 308, an action is taken by a stakeholder in response to the notification. The action may be registered by the audit engine. At step 309, the validation may be repeated. Steps 304-309 may iterate until the development guideline has passed validation. At step 310 the audit engine logs report data. At step 311, the self-learning module may update development guidelines based on report data. At step 312, the audit concludes.

Thus, apparatus and methods for an intelligent audit engine incorporating a semi-supervised machine learning algorithm are provided. Persons skilled in the art will appreciate that the present invention can be practiced by other than the described embodiments, which are presented for purposes of illustration rather than of limitation. The present invention is limited only by the claims that follow.

What is claimed is:

1. Machine-learning audit engine configured to rectify a product development failure, the audit engine comprising:
an artifact repository comprising a plurality of different product development artifacts, each of the plurality of artifacts associated with one of a plurality of different artifact tags, each artifact tag comprising a keyword;
a development guideline repository comprising a first plurality of development guidelines, each of the development guidelines associated with a one of the plurality of different artifact tags, the development guideline repository separate from the artifact repository;
a processor configured to:
retrieve a first product development artifact from the artifact repository, the first artifact comprising a first planning document;
identify the artifact tag associated with the first artifact; and
identify a second plurality of development guidelines in the development guideline repository, the second plurality of development guidelines a subset of the first plurality of development guidelines, each of the development guidelines in the second plurality of development guidelines associated with the same artifact tag as the first artifact;
machine-readable memory configured to load the second plurality of development guidelines;
the processor further configured to:
validate each of the development guidelines in the second plurality of development guidelines, the validating comprising determining, based on stored product testing data, satisfaction of the development guideline;
when a development guideline fails validation:
initiate a workflow associated with the failed development guideline, the workflow comprising generating an electronic notification of a product development stakeholder;
register an action by the stakeholder in response to the notification; and
iterate validation of the failed development guideline; and
when a development guideline passes validation, log artifact report data;
the processor comprising a machine-learning algorithm configured to, without operator input;
determine, based on artifact report data, that the failed development guideline is associated with a threshold number of validation failures; and
prioritize validation of the development guideline with regard to a second artifact, the second artifact comprising a second planning document retrieved from the artifact repository, the second planning document different from the first planning document, the prioritizing comprising instructing the processor to:
identify the prioritized development guideline when it is loaded into memory; and
validate the prioritized development guideline prior to validating all other development guidelines.

2. The audit engine of claim 1, wherein:
the product testing data is stored in a remote security protected database; and
the processor is configured to validate the development guideline by accessing the protected product testing data.

3. The audit engine of claim 1, wherein:
the plurality of development guidelines are stored in a repository associated with the audit engine; and
the machine-learning algorithm is trained to associate each of the stored development guidelines in the repository with an artifact tag.

4. The audit engine of claim 1, wherein the machine learning algorithm is further configured to:
determine, based on stored artifact report data, that a product development stakeholder is associated with a threshold number of validation failures; and
based on the determination, initiate a workflow comprising notification of a product development manager associated with the product development stakeholder that the stakeholder is associated with a threshold number of validation failures.

5. The audit engine of claim 1, wherein the electronic notification comprises:
one or more instructions for implementing a targeted remediation protocol for satisfying the failed development guideline; and
a hyperlink that conveys the stakeholder to an interface for implementing the targeted remediation protocol.

6. The audit engine of claim 5, wherein the notification is configured to register a confirmation that the stakeholder has complied with the instructions for satisfying the failed development guideline.

7. The audit engine of claim 1 further comprising an interactive dashboard display configured to display artifact report data associated with the product development stakeholder over a pre-determined time period.

* * * * *